INVENTORS
HARRY J. GRAY, JR.
PUZANT V. LEVONIAN
MORRIS RUBINOFF
BY
W R Maltby
Louis B. Applebaum
ATTORNEYS

ANALOG TO DIGITAL CONVERTER

Filed Dec. 5, 1955 3 Sheets-Sheet 2

*INVENTORS*
HARRY J. GRAY, JR.
PUZANT V. LEVONIAN
MORRIS RUBINOFF
*BY*
W R Maltby
Louis B. Applebaum
ATTORNEYS INVENTORS
HARRY J. GRAY, JR.
PUZANT V. LEVONIAN
MORRIS RUBINOFF
BY
[signature]
Louis B. Applebaum
ATTORNEYS United States Patent Office 2,791,764

Patented May 7, 1957

2,791,764

ANALOG TO DIGITAL CONVERTER

Harry J. Gray, Jr., Puzant V. Levonian, and Morris Rubinoff, Philadelphia, Pa., assignors, by mesne assignments, to the United States of America as represented by the Secretary of the Navy Application December 5, 1955, Serial No. 551,185

2 Claims. (Cl. 340—347)

This invention relates to improvements in analog to digital converters for serial computing machines, and more particularly pertains to analog to digital converters for converting a cyclic number into its binary form serially with least significant digit first.

Where the magnitude of an analog quantity is required in digital form in a serial computing machine, methods used to date worked only with the most significant digit first, so that a reversing process was necessary before the number could be read into the machine. This imposes severe limitations on the speed of conversion. To overcome this disadvantage, the subject invention accomplishes the conversion of the analog number from its voltage-analog representation as a time sequence with the least significant digit first. The conversion is sufficiently fast to allow N numbers to be converted in $N+1$ number-times, even for the fastest existing serial computing machines.

The process of conversion employed in the subject invention occurs in two steps. First, the number is converted from its voltage representation to a "reflected binary" or "cyclic" code with the least significant digit first. Second, the resultant cyclic number is transformed to its binary representation, the transformation being carried out least significant digit first.

The primary object of this invention is to provide an improved analog to digital converter for serial computing machines.

Another object is to provide an analog to digital converter whose output can be read synchronously into a high-speed digital computer by using cyclic to binary translators capable of converting a cyclic number into its binary form serially with the least significant digit first.

Other objects and many of the attendant advantages of this invention will be readily appreciated as the same becomes better understood by reference to the following detailed description when considered in connection with the accompanying drawings wherein.

Figure 1:
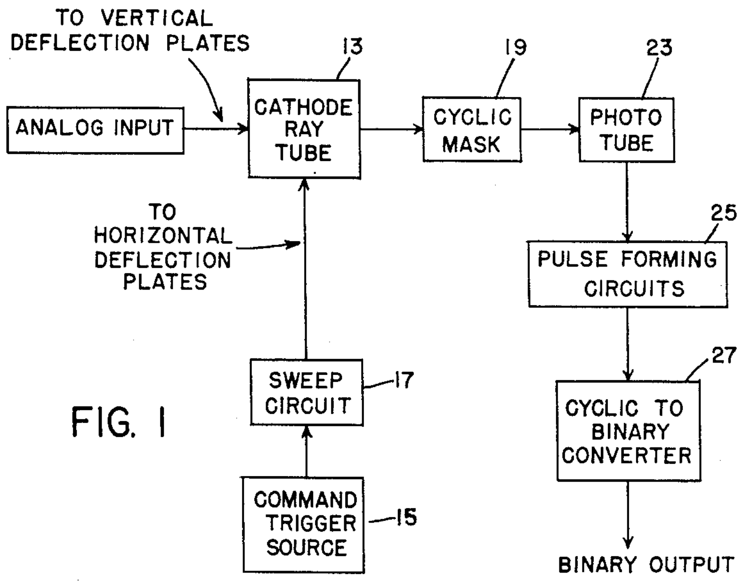
Fig. 1 is a block diagram of an analog to digital converter, showing a preferred embodiment of the invention.

In the following discussion of theoretical considerations, for any number A, the binary representation is written as $A_2$ and the cyclic representation as $Ac$. The arabic letters $aj$ and $bj$ designate digits of the binary numbers, and the Greek letters $Aj$ and $Bj$ designate digits of the cyclic numbers.

The cyclic code is derived from the binary notation by a single column shift followed by a logical addition, or addition without carry. Thus the binary number $$A_2=\sum_{j=0}^{n-1} a_j 2^j = a_{n-1}a_{n-2}\ldots a_1 a_0$$

becomes the cyclic number $$A_c=\alpha_{n-1}\ \alpha_{n-2}\ \ldots\ \alpha_1\ \alpha_0$$

where $\alpha_{n-1}=a_{n-1}$ and $\alpha_j\equiv(a_j+a_{j+1})$ (mod 2), $j=0, 1 \ldots n-2$ where mod 2 addition of two binary digits is addition without carry. Further, it is to be noted that $\alpha_j=0, 1$ as $a_j=a_{j+1}$ or $a_j\neq a_{j+1}$ respectively.

Illustrating the process for the number "thirteen": shifted

| | | | | | |
|---|---|---|---|---|---|
| A2= | 1 | 1 | 0 | 1 | |
| A2= | | 1 | 1 | 0 | (1) |
| $A_c$= | 1 | 0 | 1 | 1 | |

This leads to consideration of the following three theorems:

Theorem I: The cyclic representations of any pair of successive numbers, A and $A+1$ $(=B)$, differ in only one column.

Proof: Let $A_2=a_{n-1}a_{n-2}\ldots a_1a_0$,
$B_2=b_{n-1}b_{n-2}\ldots b_1b_0$.

(1) Suppose $a_0=0$. Then $b_0=1$ and $a_j=b_j$ for $j\neq 0$. Hence $\beta_0\equiv b_0+b_1\equiv 1+a_1$; $\alpha_0\equiv a_0+a_1=a_1$;

$$B_j\equiv b_j+b_{j+1}=a_j+a_{j+1}\equiv\alpha_j;\ j\neq 0$$

∴ In this case, $A_c$ differs from $B_c$ only in column $j=0$.

(2) Let $a_0=1$, the only other possible case. Then, $$b_0=0,\ b_1=1+a_1$$

Consider column $j=0$:

$$\beta_0=b_0+b_1=1+a_1;\ \alpha_0=a_0+a_1=1+a_1$$

Hence $\beta_0=\alpha_0$.

Consider next column $j=1$. We note in this case that $b_1=1+a_1$. If $a_1=0$ the argument of part (1) applies, $$B_1\neq\alpha_1,\ B_j=\alpha_j \text{ for } j\neq 1$$

and the theorem holds; if $a_1=1$, then $b_2\equiv 1+a_2$, the argument of part (2) holds, $B_1=\alpha_1$, but column $j=2$ must be inspected.

The process may be continued until (*a*) it terminates at column $k\neq(n-1)$ with $$\beta_k\neq\alpha_k,\ B_j=\alpha_j \textit{ for } j\neq k$$

in which case the theorem holds, or (*b*)

$$\beta_j=\alpha_j \text{ for } j<(n-1)$$

and $b_{n-1}\equiv a_{n-1}+1$. In the latter case, since there is no column $n$, $B_{n-1}\neq\alpha_{n-1}$ whether $a_{n-1}=0$ or 1. This completes the proof of the theorem.

Theorem II: The parity of $A_c$ is even or odd according as $a_0=0$ or 1.

Proof: The parity of $A_c$ is by definition the sum of the digits $\alpha_j$ of $A_c$, to modulus 2. But from Equation 1 it is seen that $$\alpha_{n-1}\alpha+_{n-2}+\ \ldots\ +\alpha_1+\alpha_0$$
$$\equiv a_{n-1}+(a_{n-1}+a_{n-2})+\ \ldots\ +(a_2+a_1)+(a_1+a_0)$$
$$\equiv 2(a_{n-1}+a_{n-2}+\ldots+a_2+a_1)+a_0$$
$$\equiv a_0 \text{ (mod 2), since } 2x\equiv 0 \text{ (mod 2) for all } x$$

$$\therefore\text{Parity of } A_c=a_0$$

Theorem III: if $$x+y\equiv z \text{ (mod 2), then } x+z\equiv y \text{ (mod 2)}$$

Proof:

$$x+z\equiv x+(x+y)$$
$$\equiv 2x+y$$
$$\equiv y \text{ (mod 2)}$$

Figure 2:
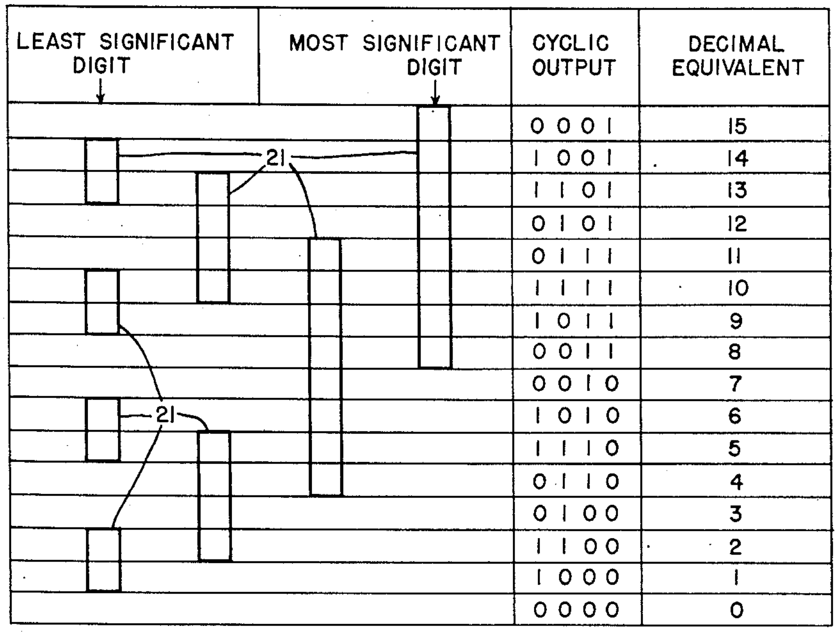
Fig. 2 is a plan view of a cyclic mask element.

In generating the cyclic representation from the voltage analog, the analog input 11 is placed on the vertical deflection plates of a cathode ray tube 13. Through a command trigger pulse derived from a source 15 and fed through a sweep circuit 17, the electron beam sweeps horizontally across the face of the tube 13 with constant velocity. A cyclic mask 19, quantized into distinct vertical levels, is placed in front of the tube 13. In the mask, at the vertical level corresponding to the number A, holes are provided to represent A in cyclic notation. The mask for a four-digit output is shown in Fig. 2, the slots 21 thereof being so placed that, at a given level, the digits of the number appear in increasing order of significance from left to right. This is the reverse of the order in which the numbers are written normally. They are placed this way so as to obtain the least significant digit of the cyclic output first, with the election beam sweeping from left to right. The mask indicates the numbers corresponding to the sixteen vertical levels in both decimal and cyclic form.

As the beam sweeps across the face of the tube 13 from left to right, the light that passes through the holes 21 in the mask is picked up by the photo-tube 23 and converted by pulse-forming circuits 25 into serial voltage pulses that represent, with the least significant digit first, the cyclic equivalent of the analog voltage input. The output of circuits 25 is fed to a cyclic to binary converter 27, hereinafter described, to produce the binary output.

The advantage of using a cyclic mask stems from the proposition that the cyclic representations of any pair of successive numbers, A and $A+1(=B)$, differ in only one column. If the electron beam sweeps between the levels representing two successive numbers, there is an ambiguity in one column only, and either one of these two successive numbers will be the resultant output. Using a binary mask, however, it is possible for an ambiguity to occur in several or all columns; a beam lying between the levels representing binary seven (0111) and binary eight (1000), for example, might result in any number between zero and fifteen, inclusive.

Since it was proved, above, that the parity of Ac is even or odd according as $a_0=0$ or 1, it follows that, in converting from cyclic code back to binary notation with least significant digit first, the first digit $a_0$ can be obtained by counting the number of "1"s mod (2) in $A_c$, using a binary counter initially reset to zero. The final state of the counter determines. $a_0$. Moreover, since $a_0+a_1$ $\equiv\alpha_0$ (mod 2), and since, if $x+y\equiv z$ (mod 2), then $x+y\equiv y$ (mod 2), then $a_0+\alpha_0\equiv\alpha_1$ (mod 2), and $a_1$ can be obtained by adding $\alpha_0$ to $a_0$ in the binary counter. Similarly, $a_j+1$ for all $j$ can be found by addition in the counter, since $a_j+1=a_j+\alpha_j$ (mod 2). Hence, the entire binary representation $A_2$ can be obtained by reading the cyclic number into the binary counter twice.

Figure 3:
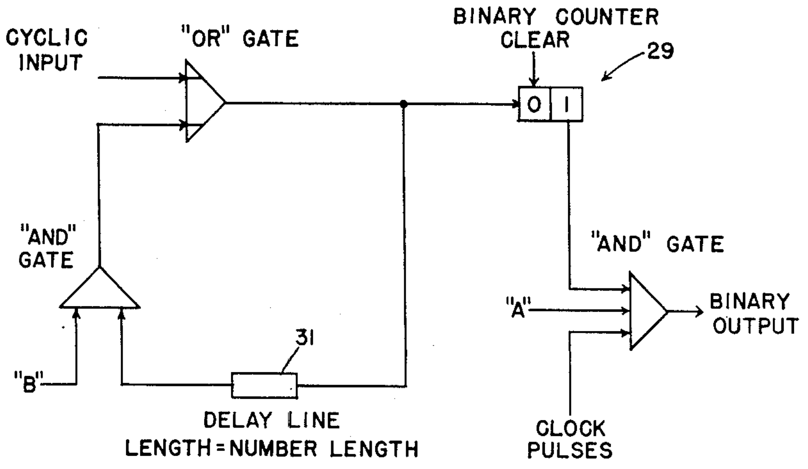
Figs. 3, 4, 5 and 6 show alternative forms of cyclic to binary converters.

In the cyclic to binary converter shown in Fig. 3, the binary counter 29 is cleared initially to the "0" stage. The output is obtained by gating clock pulses with the "1" stage of the counter. The cyclic input is read to the counter twice, once to determine the least significant digit of the binary output and a second time to produce the entire output. The second reading is obtained by circulating the cyclic number through a delay line 31 back to the input of the counter.

The control unit of a digital computer generates the "A" and "B" input pulses. Since the duration of these pulses is approximately a complete number length, suitable means such as a flip-flop can be used to generate "A" and "B". The "B" input prevents the cyclic number from circulating more than once, and the "A" input gates the correct portion of the output.

The operation of the converter of Fig. 3 is based upon the premise that $a_0$ is zero or one. Since it has been proved above that, if $x+y\equiv z$ (mod 2), then $x+y\equiv y$ (mod 2), it follows that the two resulting binary representations are 1's complements of each other. For example, for $A_c=1011$, if it is correctly assumed that $a_0=1$, then the correct binary counterpart 1101 is obtained.

However, if it is assumed incorrectly that $a_0=0$, then the incorrect binary number 0010 is obtained.

Figure 4:
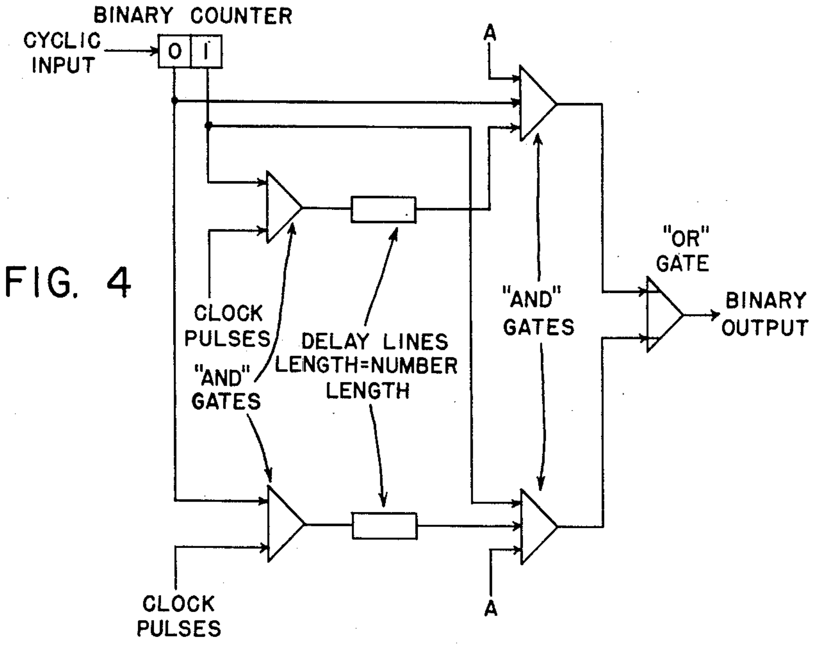

In the cyclic to binary converter shown in Fig. 4, when the cyclic number is read to the counter, both of these possibilities are generated by gating clock pulses with the opposing stages of the counter. These two binary outputs are delayed one number length until the cyclic input has been read completely to the counter. The correct output is then selected by the stage of the counter that is positive—by the parity of the cyclic input. In this converter, it is to be noted that the initial setting of the counter is immaterial, as the correct output is obtained in both cases. The "A" input is added to gate the correct portion of the output.

Figure 5:
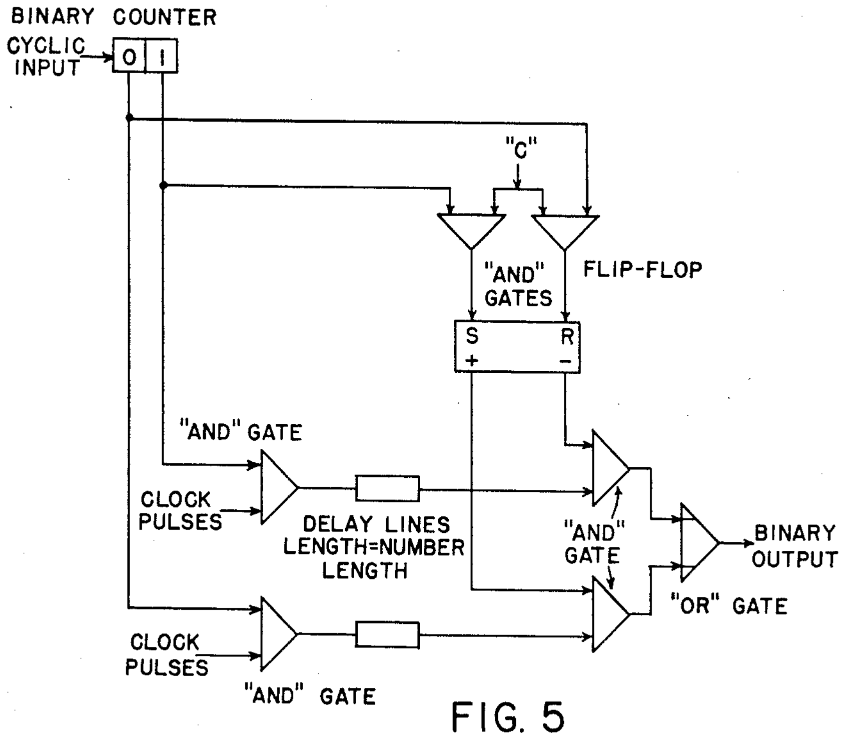

In the converter shown in Fig. 5, several cyclic numbers can be converted in sequence. The cyclic number serves as an upset input of the binary counter, which in turn keeps track of whether an even or odd number of "1"s has already appeared in the cyclic input. The outputs of the binary counter are of opposite polarity and control separate "AND" gates, which in turn feed delay lines capable of storing one number each. The clock pulses serving as input to the gates appear at the basic repetition rate, which is the same rate as the serial cyclic input of binary digits. Consequently, the two delay lines contain binary representations of the input just after the last digit of the cyclic input has been registered in the binary counter. One delay line contains the true binary, while the other contains a false binary representation: The state of the counter, after the first cyclic number is read in, is remembered by the flip-flop circuit. This releases the counter from the duty of selecting one of the two possible outputs, and it can thus be used immediately by the second cyclic number to be converted. The trigger input to the flip-flop, "C," occurs immediately after each cyclic number is read completely to the counter.

A serial digital computer (not shown) contains in its control unit the circuits necessary to provide pulse "C" at just the right time after the cyclic input was first directed to the binary counter. This time is just after the last cylic input bit is registered in the binary counter. As a result, the binary counter controls whether the flip-flop is set or reset by pulse "C." The flip-flop remembers the state of the binary counter at "C" pulse time, and permits the latter to be used in converting the next cyclic input number. At the same time, the flip-flop is connected to control two "AND" gates so that only the correct binary representation in the corresponding delay line is permitted to be emitted from the "OR" gate. The binary output is directed into the computer through this latter point.

Figure 6:
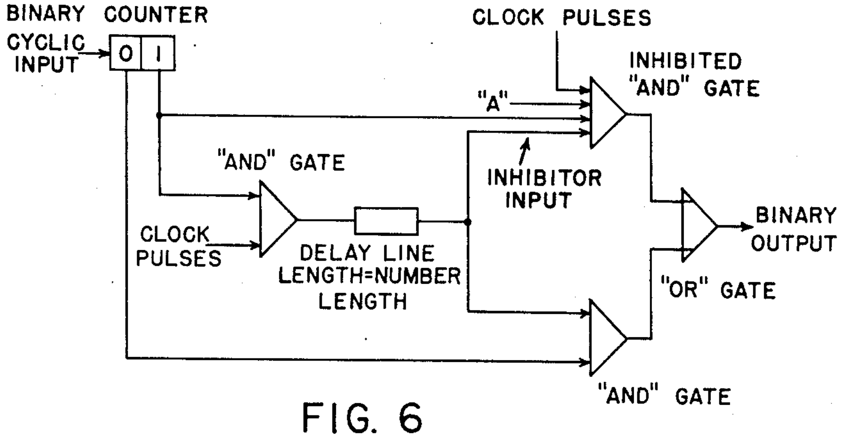

In the converter shown in Fig. 6, only one input is used, its complement being formed by an inhibitor circuit. While initial clearing of the counter is unnecessary, an "A" input is needed at the inhibitor gate to select the correct portion of the output.

The analog to digital converter here described is a system wherein N cyclic numbers can be converted in $N+1$ number times. For example, using a four-digit cyclic mask with a 5 inch cathode ray tube that could accommodate 256 lines (an 8 digit mask). With the line separation 0.5 mm. and the horizontal separation approximately one-half inch overall, resolution of vertical lines and correct operation at a one megacycle pulse rate obtains, with pulse resolution remaining adequate up to at least four megacycles.

Obviously many modifications and variations of the present invention are possible in the light of the above teachings. It is therefore to be understood that within the scope of the appended claims the invention may be practiced otherwise than as specifically described.

We claim:

1. In an analog to digital converter, a cyclic to binary converter comprising a binary counter adapted to receive a cyclic input, first and second "AND" gates fed by opposing stages of said counter respectively, clock pulses gated with said stages, first and second delay line circuits each having a length equal to word length coupled to said first and second gates respectively, third and fourth "AND" gates fed by said first and second circuits respectively, fifth and sixth "AND" gates fed by opposing stages of said counter respectively and by pulsing means synchronized with the delivery of such cyclic input, a flip-flop circuit receiving the output of said fifth and sixth gates and feeding said third and fourth gates, and an "OR" gate receiving the output of said third and fourth gates whereby a binary output is presented.

2. The combination of claim 1 wherein said flip-flop circuit comprises setting means delivering negative output polarity to said fourth gate and positive output polarity to said third gate, and resetting means delivering positive output polarity to said fourth gate and negative output polarity to said third gate.

No references cited.